United States Patent
Yanai et al.

(10) Patent No.: US 10,462,268 B2
(45) Date of Patent: Oct. 29, 2019

(54) DATA TRANSMITTING/RECEIVING APPARATUS AND DATA TRANSMITTING/RECEIVING METHOD

(71) Applicant: Mitsubishi Electric Corporation, Tokyo (JP)

(72) Inventors: Takayuki Yanai, Tokyo (JP); Tomoki Yamamoto, Tokyo (JP); Masahiro Nakajima, Tokyo (JP); Ryo Miyashita, Tokyo (JP)

(73) Assignee: Mitsubishi Electric Corporation, Chiyoda-ku, Tokyo (JP)

(*) Notice: Subject to any disclaimer, the term of this patent is extended or adjusted under 35 U.S.C. 154(b) by 0 days.

(21) Appl. No.: 15/453,984

(22) Filed: Mar. 9, 2017

(65) Prior Publication Data
US 2018/0077269 A1    Mar. 15, 2018

(30) Foreign Application Priority Data

Sep. 14, 2016    (JP) .................................. 2016-179254

(51) Int. Cl.
*H04L 29/06*    (2006.01)
*H04L 7/04*    (2006.01)
(Continued)

(52) U.S. Cl.
CPC .......... *H04L 69/22* (2013.01); *G06F 13/4282* (2013.01); *H04L 7/041* (2013.01); *H04L 7/0008* (2013.01); *H04L 2007/045* (2013.01)

(58) Field of Classification Search
None
See application file for complete search history.

(56) References Cited

U.S. PATENT DOCUMENTS 4,945,548 A * 7/1990 Iannarone ................. G06F 5/14
370/506
5,412,698 A * 5/1995 Van Brunt ............ H04L 7/0338
327/141
(Continued)

FOREIGN PATENT DOCUMENTS

JP    H08-125645 A    5/1996
JP    8-207008 A    8/1996
(Continued)

OTHER PUBLICATIONS

Communication dated Dec. 5, 2017, from Japanese Patent Office in counterpart application No. 2016-179254.

*Primary Examiner* — Faruk Hamza
*Assistant Examiner* — Cassandra L Decker
(74) *Attorney, Agent, or Firm* — Sughrue Mion, PLLC; Richard C. Turner

(57) ABSTRACT

A data transmitting device includes: a judge code generating portion for transmitting a plurality of times a predefined code pattern indicating a head portion of transmission data, as a judge code; a start code generating portion for transmitting at least once a start code having a predefined code pattern different from the judge code, following the judge code; and a valid data generating portion for transmitting valid data, following the start code. After receiving the judge code for a predetermined number of times that is less by at least one than the number of times that the judge code is transmitted, a data receiving device enters a standby state for receiving the start code, and, after receiving the start code, receives the valid data.

5 Claims, 3 Drawing Sheets

(51) Int. Cl.
*G06F 13/42* (2006.01)
*H04L 7/00* (2006.01)

(56) References Cited

U.S. PATENT DOCUMENTS

| | | | | |
|---|---|---|---|---|
| 5,748,676 | A * | 5/1998 | Mahany | H04B 7/0811 |
| | | | | 375/260 |
| 7,161,955 | B1 * | 1/2007 | Zeng | H04L 7/042 |
| | | | | 370/466 |
| 8,891,592 | B1 * | 11/2014 | Zhang | H04W 56/00 |
| | | | | 375/149 |
| 10,212,682 | B2 * | 2/2019 | Solum | H04W 56/0035 |
| 2001/0042058 | A1 * | 11/2001 | Harrington | G06F 9/5016 |
| 2004/0057542 | A1 * | 3/2004 | Knapp | H03L 7/06 |
| | | | | 375/355 |
| 2009/0202026 | A1 * | 8/2009 | Huang | H04L 7/033 |
| | | | | 375/355 |
| 2014/0146833 | A1 * | 5/2014 | Lusted | H04L 12/413 |
| | | | | 370/437 |
| 2014/0355724 | A1 * | 12/2014 | Hayakawa | H04L 7/033 |
| | | | | 375/342 |

FOREIGN PATENT DOCUMENTS

| | | |
|---|---|---|
| JP | 10-336246 A | 12/1998 |
| JP | 2012-124716 A | 6/2012 |

\* cited by examiner

DATA TRANSMITTING/RECEIVING APPARATUS AND DATA TRANSMITTING/RECEIVING METHOD

BACKGROUND OF THE INVENTION

1. Field of the Invention

The present invention relates to a data transmitting/receiving apparatus and a data transmitting/receiving method in which serial communication is performed between a data transmitting device and a data receiving device.

2. Description of the Background Art

A data receiving device may fail to receive data transmitted from a data transmitting device when one or more cycles of delay have occurred between a clock and data as a result of, for example, a delay in a data transmission line between the data transmitting device and the data receiving device, or a delay in the circuit of the data transmitting device or the data receiving device.

In order to inhibit this data reception failure, for example, the control system disclosed in Japanese Laid-Open Patent Publication No. 2012-124716 counts the number of cycles between the transmission end timing of a command and the receiving timing of data for that command, when the command is transmitted to the data transmitting device. Also, the system has a calibration function for adding, by using a plurality of delay elements provided in advance in the circuit, a delay corresponding to the number of cycles, and normal data transfer is performed by the calibration function.

However, with the control system according to Japanese Laid-Open Patent Publication No. 2012-124716, there is a problem that it is necessary to periodically execute a complex sequence of selecting a delay element by calibration, and thus, communication may not be performed immediately when necessary. Another problem is that, when calibration is performed periodically, communication cannot be performed during the calibration, resulting in a reduction in the amount of data transfer.

SUMMARY OF THE INVENTION

The present invention has been made to solve the above-described problems, and an object of the present invention is to provide a data transmitting/receiving apparatus and a data transmitting/receiving method that do not require a periodical calibration function, and that can establish communication between a data transmitting device and a data receiving device by simply adding a specific judge code and a specific start code to communication data even when there is a large difference of signal delay amount between the data transmitting device and the data receiving device.

A data transmitting/receiving apparatus according to the present invention is a data transmitting/receiving apparatus in which serial communication is performed between a data transmitting device and a data receiving device, wherein the data transmitting device includes: a judge code generating portion for transmitting a plurality of times a predefined code pattern indicating a head portion of transmission data, as a judge code; a start code generating portion for transmitting at least once a start code having a predefined code pattern different from the judge code, following the judge code; and a valid data generating portion for transmitting valid data, following the start code.

A data transmitting/receiving method according to the present invention is a data transmitting/receiving method in which serial communication is performed between a data transmitting device and a data receiving device, wherein, after successively transmitting at least twice a predefined code pattern indicating a head portion of transmission data, as a judge code, the data transmitting device transmits valid data immediately after transmitting at least once a start code having a predefined code pattern different from the judge code.

According to the present invention, even when the signal delay difference between the data transmitting device and the data receiving device is large, it is possible to perform normal communication without the need for a complex sequence. Since data of a specific code indicating a head portion of transmission data is transmitted in addition to valid data, there is a concern that the effective transmission rate may be reduced. However, it is not necessary to take into consideration the timing constraint between the data valid signal as a chip select and the clock, so that the clock frequency can be increased, as a result of which it is possible to increase the effective transmission rate.

The foregoing and other objects, features, aspects and advantages of the present invention will become more apparent from the following detailed description when read in conjunction with the accompanying drawings.

DETAILED DESCRIPTION OF THE PREFERRED EMBODIMENTS OF THE INVENTION

First Embodiment

Hereinafter, a data transmitting/receiving apparatus and a data transmitting/receiving method according to a first embodiment of the present invention will be described with reference to FIGS. 1 to 5.

Figure 1:
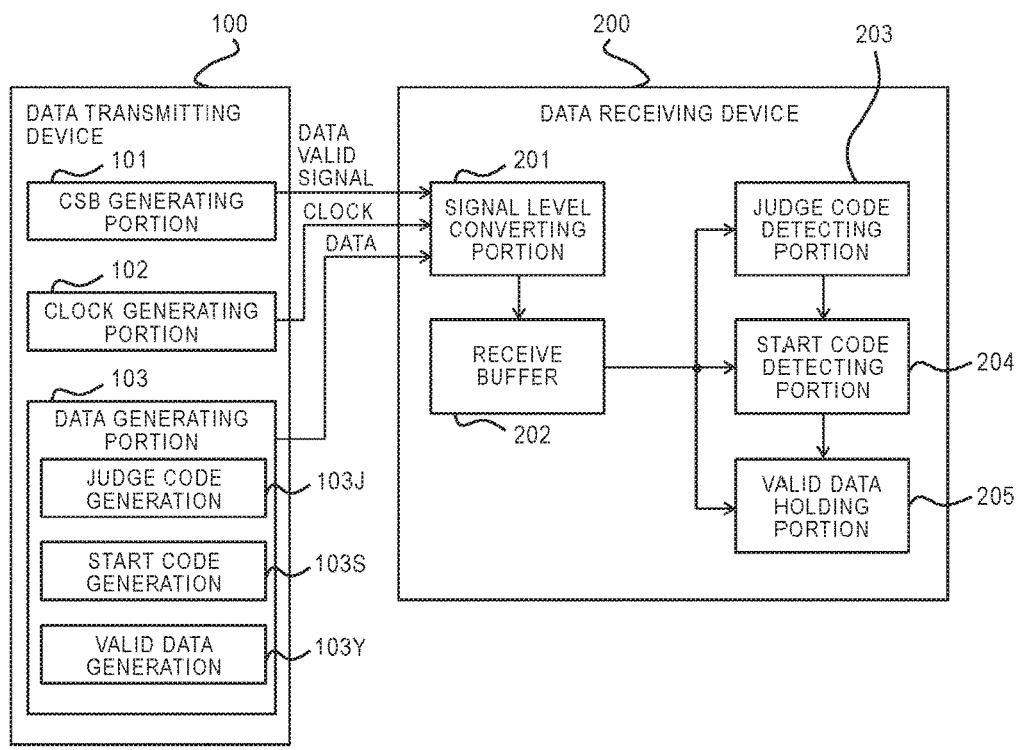
FIG. 1 is a block diagram showing a data transmitting/receiving apparatus according to a first embodiment of the present invention.

FIG. 1 is a block diagram showing the data transmitting/receiving apparatus according to the first embodiment. The data transmitting/receiving apparatus is composed of a data transmitting device 100 and a data receiving device 200, and serial communication is performed between the two devices.

The data transmitting device 100 includes a CSB generating portion 101 for generating a data valid signal as a chip select (CSB), a clock generating portion 102 for generating a clock signal for achieving signal synchronization, and a data generating portion 103 for generating a signal containing valid data that is to be transmitted.

Further, the data generating portion 103 is composed of: a judge code generating portion 103J for transmitting a plurality of times (K times) a predefined specific code pattern indicating a head portion of transmission data, as a judge code; a start code generating portion 103S for transmitting at least once (S times) a start code having a predefined specific code pattern different from the judge code, following the judge code; and a valid data generating portion 103Y for transmitting valid data, following the start code.

The data receiving device 200 is composed of: a signal level converting portion 201 for converting the levels of a data valid signal transmitted by the CSB generating portion 101, a clock transmitted by the clock generating portion 102, and signals of data transmitted by the data generating portion 103, of the data transmitting device 100; a receive buffer 202 for temporarily holding data converted by the signal level converting portion 201; a judge code detecting portion 203 for detecting a judge code indicating a head of data from a signal from the receive buffer 202; a start code detecting portion 204 for detecting a start code indicating the start position of valid data; and a valid data holding portion 205 for holding valid data.

Upon detecting the judge code for the number of times that is less by at least one (K−1) than the number of times (K times) that the judge code has been transmitted from the judge code generating portion 103J of the data transmitting device 100, the judge code detecting portion 203 enters a standby state in which the start code detecting portion 204 detects the start code. When the start code detecting portion 204 has detected the start code for the number of times that is equal to the number of times (S times) that the start code generating portion 103S of the data transmitting device 100 has transmitted the start code, the valid data holding portion 205 receives valid data that is transmitted subsequently to the start code, and holds that valid data.

Figure 2:
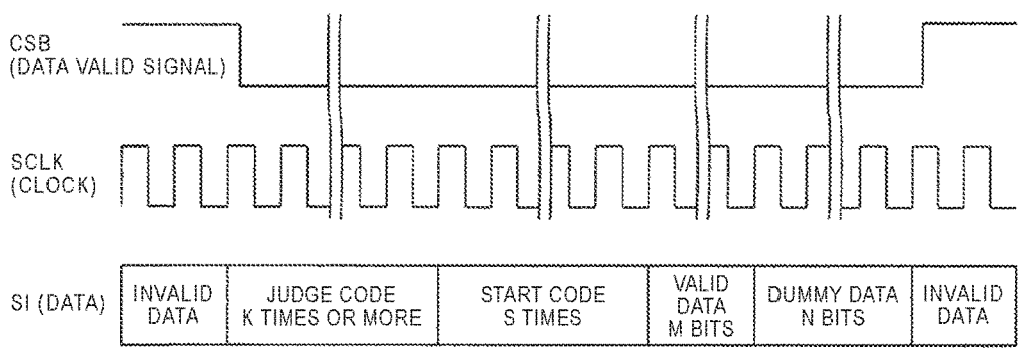
FIG. 2 shows a timing chart of a data transmitting/receiving method according to the first embodiment of the present invention.

FIG. 2 shows a timing chart of a data transmitting/receiving method according to the first embodiment. The illustrated example assumes communication in which a period during which the data valid signal (CSB=chip select) is "L" is a data valid period, and data (SI) during the data valid period is captured at a falling edge of a clock (SCLK).

After lowering the data valid signal (CSB), the data transmitting device 100 transmits, as data, a specific judge code at least twice (K times), a specific start code at least once (S times), M bits of valid data, and N bits of dummy data, and subsequently raises the data valid signal (CSB).

Upon receiving the specific judge code not less than once and not more than (K−1) times after the data valid signal (CSB) has been lowered, the data receiving device 200 enters a standby state for receiving the specific start code, and, after receiving the specific start code S times, receives the M-bit valid data. The N-bit dummy data is ignored.

Since the data at the time when the data valid signal (CSB) is "H" is not captured, the data at the time when the data valid signal (CSB) is "H" is regarded as invalid data. To prevent the data valid signal (CSB) from rising during transmission of valid data, the N-bit dummy data is necessary.

Figure 3:
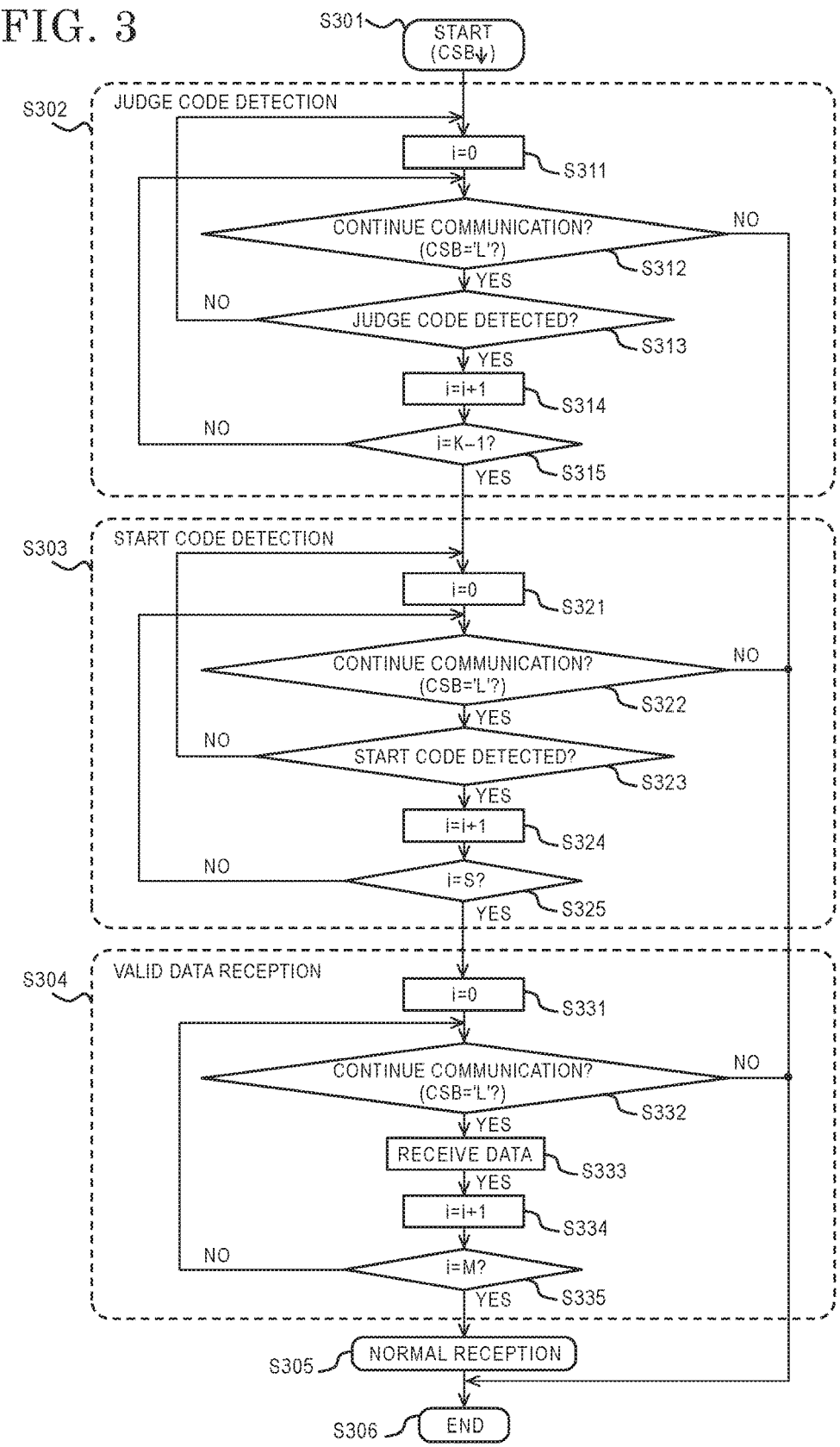
FIG. 3 shows a flowchart of the data transmitting/receiving method according to the first embodiment of the present invention.

FIG. 3 shows a flowchart of the data transmitting/receiving method according to the first embodiment. The drawing shows a case where the data transmitting device 100 successively transmits the judge code K times, the start code S times, and M bits of valid data, and the data receiving device 200 receives the M bits of valid data upon detecting the start code S times following the detection of the judge code for (K−1) times.

In FIG. 3, in step S301, communication is started at a falling edge of the data valid signal (CSB). Next, the procedure proceeds to the detection of the judge code in step S302, and the following process is executed in the detection of the judge code in S302.

First, in step S311, a loop variable is initialized (i=0). Next, in step S312, it is determined whether to continue communication. If the data valid signal (CSB) is "L" (YES), the procedure proceeds to the next step S313. If the data valid signal (CSB) is not "L" (NO), the procedure ends.

Next, in step S313, it is determined whether the judge code has been detected. If the judge code has been detected (YES), the procedure proceeds to the next step S314. If the judge code has not been detected (NO), the procedure returns to step S311. Next, in step S314, the loop variable is increased by 1 (i=i+1). Next, in step S315, it is determined whether the loop variable is (K−1). If the loop variable has reached (K−1) (YES), the procedure proceeds to the detection of the start code, which is the next step S303. If the loop variable has not reached (K−1) (NO), the procedure returns to step S312.

Next, the following process is executed in the detection of the start code in step S303.

First, in step S321, the loop variable is initialized (i=0). Next, in step S322, it is determined whether to continue communication. If the data valid signal (CSB) is "L" (YES), the procedure proceeds to step S323. If the data valid signal (CSB) is not "L" (NO), the procedure ends.

Next, in step S323, it is determined whether the start code has been detected. If the start code has been detected (YES), the procedure proceeds to the next step S324. If the start code has not been detected (NO), the procedure returns to step S321. Next, in step S324, the loop variable is increased by 1 (i=i+1).

Next, in step S325, it is determined whether the loop variable is S. If the loop variable has reached S (YES), the procedure proceeds to the reception of valid data, which is the next step S304. If the loop variable has not reached S (NO), the procedure returns to step S322.

Next, the following process is executed in the reception of valid data in step S304.

First, in step S331, the loop variable is initialized (i=0). Next, in step S332, it is determined whether to continue communication. If the data valid signal (CSB) is "L" (YES), the procedure proceeds to the next step S333. If the data valid signal (CSB) is not "L" (NO), the procedure ends.

Next, in step S333, the valid data is received. Next, in step S334, the loop variable is increased by 1 (i=i+1). Next, in step S335, it is determined whether the loop variable is M. If the loop variable has reached M (YES), the procedure proceeds to the next step S305. If the loop variable has not reached M (NO), the procedure returns to step S332.

If the loop variable is M in step S335, the valid data is normally received in the next step S305, and the normal reception ends in step S306.

Next, a specific example of the data transmitting/receiving method according to the first embodiment will be described with reference to the timing chart shown in FIG. 4.

Figure 4:
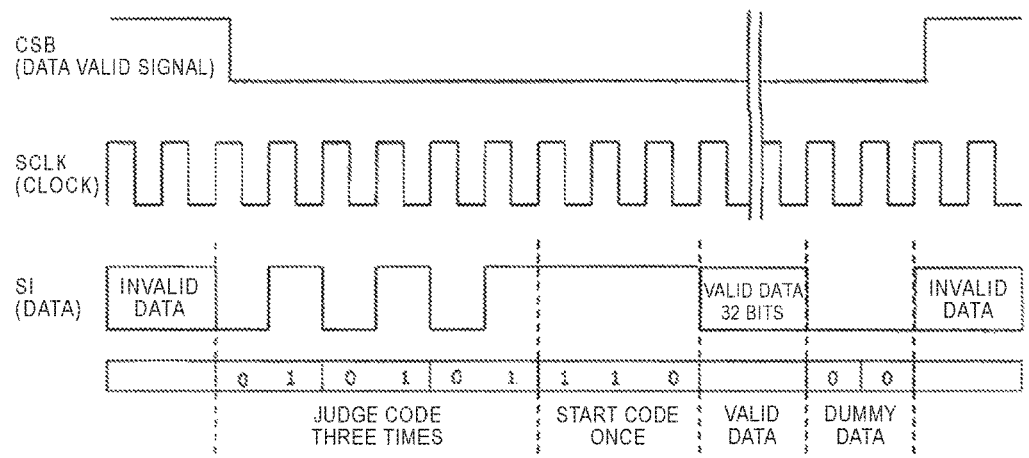
FIG. 4 shows a specific timing chart of the data transmitting/receiving method according to the first embodiment of the present invention.

In FIG. 4, with the judge code serving as a specific code pattern indicating a head portion of transmission data being set as "01", the start code as "110" and the last dummy data as "0", the data transmitting device 100 transmits the judge code three times (K=3), the start code once (S=1), 32 bits of valid data (M=32), and 2 bits of dummy data (N=2).

The start code transmitted by the data transmitting device 100 is not composed of consecutive bits of the value that is the same as the value of the last bit of the judge code value, and does not contain the same bit pattern as the judge code.

Upon receiving the judge code twice, the data receiving device 200 enters a standby state for receiving the start code, and receives the start code once, and subsequently receives the 32-bit valid data. The 2-bit dummy data is ignored.

Figure 5:
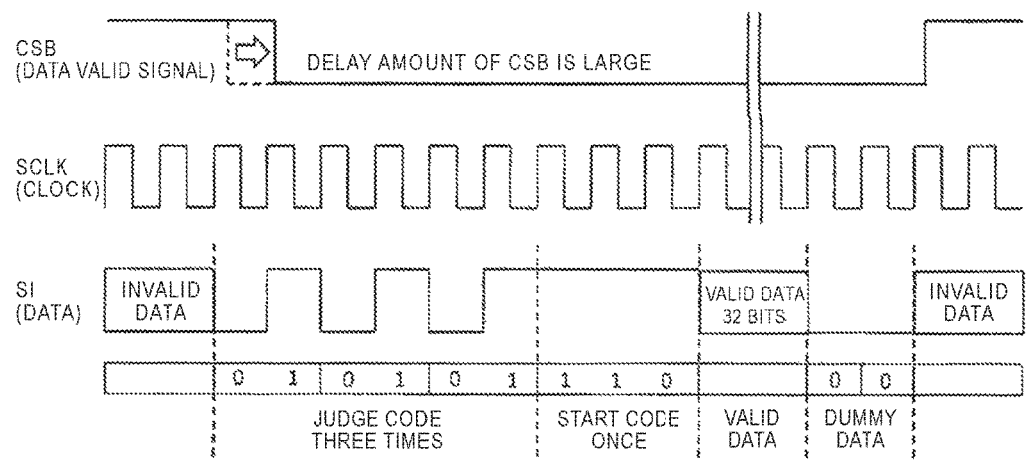
FIG. 5 shows a timing chart for a specific case where a delay difference occurs between signals in the data transmitting/receiving method according to the first embodiment of the present invention.

FIG. 5 shows a timing chart for a case where a delay difference has occurred between the data valid signal and signals of the data and the clock in a specific example of the data transmission/reception as shown in FIG. 4.

As shown in FIG. 5, the delay amount of the data valid signal (CSB) is large, and therefore, the first judge code cannot be obtained. However, the second and third judge codes can be obtained, and thus, the judge code can be received 2(K−1) times. After the start code has been received once, the 32-bit valid data can be received.

As described above, the data transmitting/receiving apparatus and the data transmitting/receiving method according to the present invention add a specific judge code a plurality of times (K times) and a start code at least once (S times) to data transmitted by the data transmitting device 100. After detecting the judge code (K−1) times or less, the data receiving device 200 enters in a standby state for receiving the start code, and detects the start code S times, and subsequently receives the valid data. This makes it possible to normally receive data even when the judge code has been failed to be received once due to a large difference of delay amount between the data valid signal received by the data receiving device 200 from the data transmitting device 100 and each of the data and the clock.

Although am embodiment of the present invention has been described above, the present invention is not limited to the embodiment, and various design changes can be made. In the scope of the present invention, such embodiments can be freely combined together, modified, or omitted.

Various modifications and alterations of this invention will be apparent to those skilled in the art without departing from the scope and spirit of this invention, and it should be understood that this is not limited to the illustrative embodiments set forth herein.

What is claimed is:

1. A data transmitting/receiving apparatus in which serial communication is performed between a data transmitting device and a data receiving device,
wherein the data transmitting device is configured to:
   transmit a first number of times a predefined code pattern indicating a head portion of transmission data, as a judge code, wherein the first number of times is preset and is at least 2,
   transmit at least once a start code having a predefined code pattern different from the judge code, following the judge code, and
   transmit valid data, following the start code; and
wherein the data receiving device is configured to:
   detect the judge code so that, when the judge code is not detected based on a clock signal at a first time point, the judge code is detected based on a clock signal at a second time point later in time than the first time point, among clock signals,
   count a second number of times that the judge code is detected at the clock signals that are consecutive and next to each other in time,
   based on the counting the judge code for the second number of times fewer by at least one than the first number of times the judge code is transmitted from the data transmitting device, enter a standby state for receiving the start code, and detect the start code, and
   receive and hold the valid data transmitted following the start code.

2. The data transmitting/receiving apparatus according to claim 1, wherein the data receiving device is further configured to:
   detect whether a data valid signal is received at each of the clock signals,
   based on the data valid signal being detected, count the second number of times that the judge code is detected,
   wherein the data valid signal is not detected at the clock signal at the first time point and is detected at the clock signal at the second time point.

3. A data transmitting/receiving method in which serial communication is performed between a data transmitting device and a data receiving device, the data transmitting/receiving method comprising:
   after successively transmitting a first number of times a predefined code pattern indicating a head portion of transmission data, as a judge code, transmitting, by the data transmitting device, valid data immediately after transmitting at least once a start code having a predefined code pattern different from the judge code, wherein the first number of times is preset and is at least 2;
   detecting, by the data receiving device, the judge code so that, when the judge code is not detected based on a clock signal at a first time point, the judge code is detected based on a clock signal at a second time point later in time than the first time point, among clock signals;
   counting a second number of times that the judge code is detected at the clock signals that are consecutive and next to each other in time,
   based on the counting the judge code for the second number of times fewer by at least one than the first number of times the judge code is transmitted from the data transmitting device, entering, by the data receiving device, a standby state for receiving the start code, and detecting the start code; and
   receiving and holding, by the data receiving device, the valid data which is transmitted following the start code.

4. The data transmitting/receiving method according to claim 3, further comprising:
   recognizing, by the data receiving device, data being received as the valid data immediately after the detecting the start code for a number of times that the data transmitting device has transmitted the start code.

5. The data transmitting/receiving method according to claim 3, wherein the start code transmitted by the data transmitting device is not composed of consecutive bits of a value that is the same as a value of a last bit of the judge code, and does not contain the same bit pattern as a bit pattern of the judge code.

* * * * *